(12) United States Patent
Higuchi

(10) Patent No.: US 11,137,902 B2
(45) Date of Patent: Oct. 5, 2021

(54) CHARACTER INPUT DEVICE, CHARACTER INPUT METHOD, AND CHARACTER INPUT PROGRAM

(71) Applicant: OMRON Corporation, Kyoto (JP)

(72) Inventor: Yosuke Higuchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/794,298

(22) Filed: Feb. 19, 2020

(65) Prior Publication Data
US 2020/0293188 A1 Sep. 17, 2020

(30) Foreign Application Priority Data

Mar. 14, 2019 (JP) .............................. JP2019-046964

(51) Int. Cl.
*G06F 3/0488* (2013.01)
*G06F 3/01* (2006.01)

(52) U.S. Cl.
CPC .......... *G06F 3/04883* (2013.01); *G06F 3/018* (2013.01)

(58) Field of Classification Search
CPC .... G06F 3/04883; G06F 3/018; G06F 3/0488; G06F 3/0233
See application file for complete search history.

(56) References Cited

U.S. PATENT DOCUMENTS

| 9,244,604 | B1* | 1/2016 | Lewbel | G06F 3/0488 |
| 2009/0265669 | A1* | 10/2009 | Kida | G06F 3/0236 |
| | | | | 715/863 |
| 2011/0285651 | A1* | 11/2011 | Temple | G06F 3/0233 |
| | | | | 345/173 |
| 2012/0249596 | A1* | 10/2012 | Colley | G06F 3/0418 |
| | | | | 345/660 |
| 2012/0302291 | A1* | 11/2012 | Mori | G06F 3/018 |
| | | | | 455/566 |
| 2013/0033444 | A1* | 2/2013 | Park | G06F 3/018 |
| | | | | 345/173 |
| 2013/0311956 | A1* | 11/2013 | Li | G06F 3/04883 |
| | | | | 715/863 |
| 2014/0055371 | A1* | 2/2014 | Li | G06F 3/04883 |
| | | | | 345/173 |
| 2014/0333549 | A1* | 11/2014 | Suemune | G06F 3/04895 |
| | | | | 345/173 |
| 2016/0132119 | A1* | 5/2016 | Temple | G06F 3/04883 |
| | | | | 345/168 |

(Continued)

FOREIGN PATENT DOCUMENTS

| JP | 2015-2520 A | 1/2015 |
| WO | 2014003138 A1 | 1/2014 |

OTHER PUBLICATIONS

The Extended European Search Report dated Jul. 28, 2020 for the counterpart European patent application.

*Primary Examiner* — Shen Shiau
(74) *Attorney, Agent, or Firm* — Metrolex IP Law Group, PLLC

(57) ABSTRACT

A character input device includes an operation unit that receives a character input performed with a flick input, a slide detector that detects a starting position of the flick input, and a determination unit that adjusts an input determination area for the character input in response to the starting position in accordance with an input error count for the flick input.

3 Claims, 7 Drawing Sheets

(56) References Cited

U.S. PATENT DOCUMENTS

| | | | |
|---|---|---|---|
| 2016/0188203 A1* | 6/2016 | Fu | G06F 3/0236 |
| | | | 715/773 |
| 2016/0349986 A1* | 12/2016 | Itou | G06F 3/04883 |
| 2016/0357304 A1* | 12/2016 | Hatori | G06F 3/04883 |
| 2017/0160924 A1* | 6/2017 | Xie | G06F 3/04886 |
| 2017/0168711 A1* | 6/2017 | Temple | G06F 3/04886 |
| 2017/0192671 A1 | 7/2017 | Osborne et al. | |
| 2019/0272061 A1* | 9/2019 | Nonomura | G06F 3/0418 |

* cited by examiner

A flick input starting at "ま" as starting position S1, with a flick F1 in an upward operation direction generates the "む" input character.

A flick input starting at "た" as starting position S2, with a flick F2 in an upward operation direction generates the "つ" input character.

CHARACTER INPUT DEVICE, CHARACTER INPUT METHOD, AND CHARACTER INPUT PROGRAM

CROSS-REFERENCE TO RELATED APPLICATION

This application claims priority to Japanese Patent Application No. 2019-046964 filed on Mar. 14, 2019, the contents of which are incorporated herein by reference.

FIELD

The disclosure relates to a technique for inputting characters on a touchscreen input device.

BACKGROUND

A structure described in Patent Literature 1 assists an input operation including a sliding operation by extending a recognition area in the direction of the sliding operation.

CITATION LIST

Patent Literature

Patent Literature 1: Japanese Unexamined Patent Application Publication No. 2015-2520

SUMMARY

Technical Problem

However, the structure described in Patent Literature 1 visually enlarges a character located in the sliding direction independently of input errors possibly made by a user. More specifically, the structure does not determine the tendency of operation in an input operation performed by the user, and thus cannot reduce input errors.

One or more aspects are directed to a technique for reducing input errors based on a tendency in an input operation performed by a user.

Solution to Problem

A character input device includes an operation unit that receives a character input performed with a flick input, a slide detector that detects a starting position of the flick input, and a determination unit that adjusts an input determination area for the character input in response to the starting position in accordance with an input error count for the flick input.

This structure may adjust the input determination area by detecting a flick direction based on the starting position and the vector of a flick input, thus reducing input errors and improving usability for the user.

The determination unit in the character input device may detect a character for which an input error is likely to occur, or a time at which an input error is likely to occur based on a context of the character input and the input error count.

This structure may analyze the tendency of input errors made by the user based on the context and the number of input errors in character input, and thus reduces input errors further.

The slide detector in the character input device may measure an operation vector in the flick input. A controller may adjust the input determination area in accordance with the operation vector.

This structure may use the velocity of a flick input in adjusting the input determination area in accordance with the situation in the flick input, and improves usability for the user further.

The slide detector in the character input device may measure an operation direction in the flick input. The controller may adjust the input determination area in accordance with the operation direction.

This structure may use the operation direction of a flick input in adjusting the input determination area in accordance with the situation in the flick input, and improves usability for the user further.

The controller in the character input device may set a threshold for the input error count, and adjust the input determination area when the input error count exceeds the threshold.

This structure may adjust the input determination area in accordance with the number of input errors.

Advantageous Effects

One or more aspects can reduce input errors based on a tendency in an input operation performed by a user.

DETAILED DESCRIPTION

Embodiments will now be described with reference to the drawings.

Example Use

Figure 1:
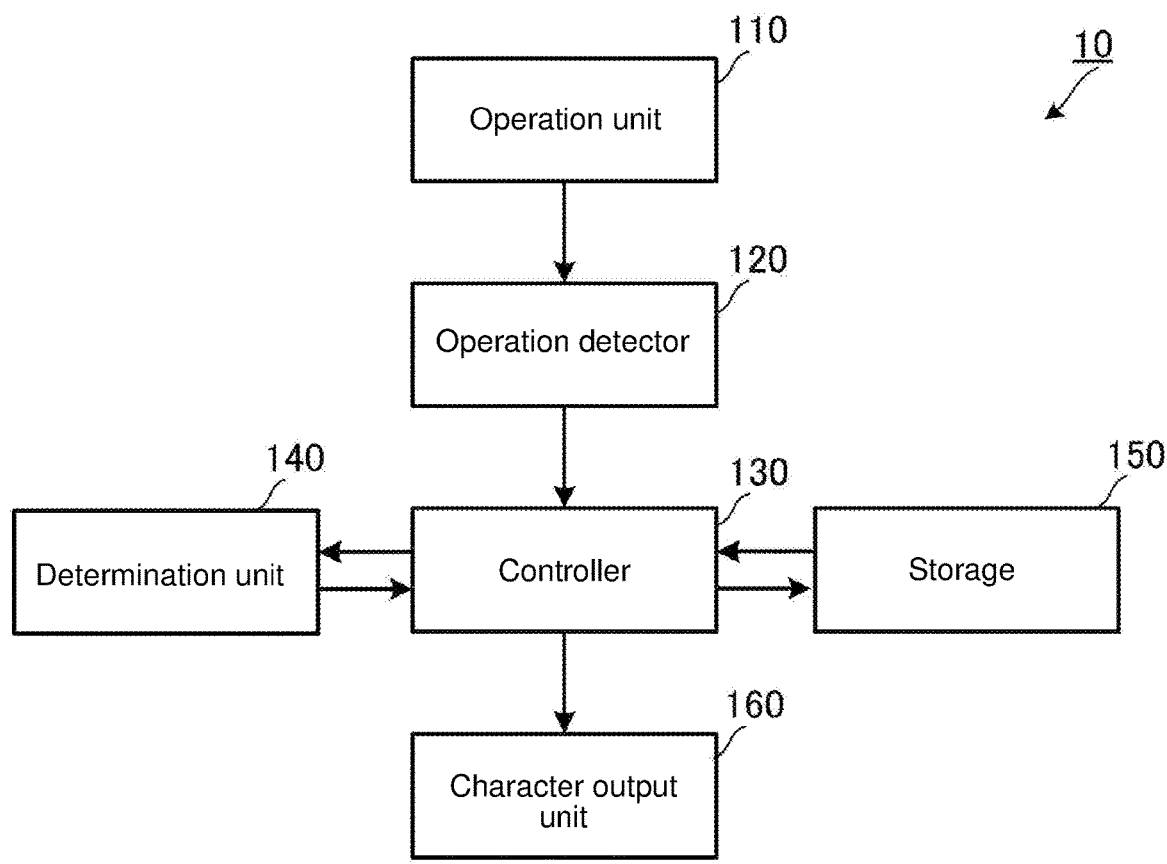
FIG. 1 is a block diagram illustrating a character input device according to a first embodiment.

An example use will be described first with reference to FIG. 1. FIG. 1 is a block diagram of a character input device 10 according to a first embodiment. The character input device 10 is included in, for example, a mobile communication terminal such as a smartphone, and allows a user to input characters by performing an operation on a touchscreen display.

The character input device 10 includes an operation unit 110, an operation detector 120, a controller 130, a determination unit 140, a storage 150, and a character output unit 160. A character input operation (described below) includes flick inputs with digits. A flick input refers to inputting characters by sliding on a touchscreen display. Although Japanese characters are input in the example below, the technique described herein is also applicable to inputting alphabetical characters.

The operation unit 110 is, for example, a software keyboard on a touchscreen display that displays keys and receives character inputs. The operation unit 110 includes multiple input determination areas.

The operation detector 120 detects a character input on the operation unit 110 and outputs information indicating the sliding direction of the character input (hereafter, a first operation direction), an initially input character (hereafter, a first input character), and an operation starting position for the first input character (hereafter, a first starting position) to the controller 130.

The controller 130 outputs the first input character to the character output unit 160. The user views and recognizes the first input character on the character output unit 160.

When determining that the first input character has an input error, the user presses a delete button. The operation detector 120 then receives a deletion operation and outputs information indicating the deletion operation to the controller 130. The controller 130 deletes the first input character output to the character output unit 160.

The user then inputs a correct character (hereafter, a second input character). The operation unit 110 receives the input of the second input character.

The operation detector 120 detects the character input on the operation unit 110 and outputs information indicating the sliding direction of the character input (hereafter, a second operation direction), the second input character, and an operation starting position for the second input character (hereafter, a second starting position) to the controller 130.

The controller 130 outputs information indicating the first starting position, the first operation direction, and the second input character to the determination unit 140. The determination unit 140 compares the first input character with the second input character. The determination unit 140 determines that the user has made an input error when the second input character differs from the first input character.

The determination unit 140 associates the first starting position, the first operation direction, and the second input character with one another, and outputs the information to the controller 130. The controller 130 associates the first starting position, the first operation direction, and the second input character with one another, and stores the information in the storage 150.

The determination unit 140 repeats the above operations to count the number of input errors.

As a result, the controller 130 determines that the user is likely to use the first starting position and the first operation direction to input the second input character. The determination unit 140 also calculates, for example, the average for the first starting position to correct the input determination area for the second input character. The input determination area is used to determine the character used as the starting point for up/down or right/left sliding in a flick input to input a character.

The above structure can correct the input determination area in accordance with the operation performed by the user, and thus improves usability for the user.

Example Structure 1

Figure 2A:
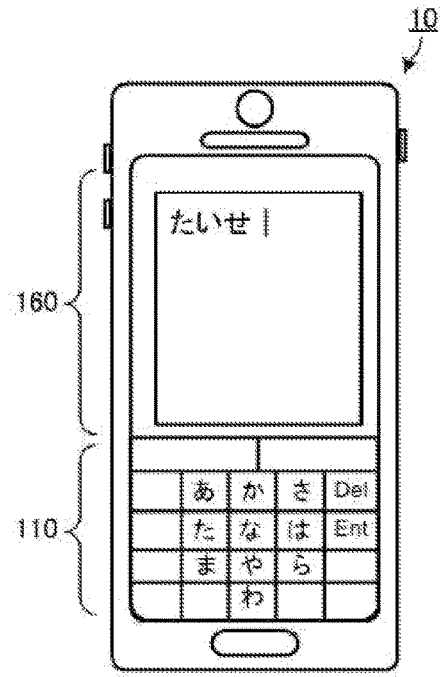
FIGS. 2A to 2C are schematic diagrams illustrating a character input device according to a first embodiment.
Figure 2B:
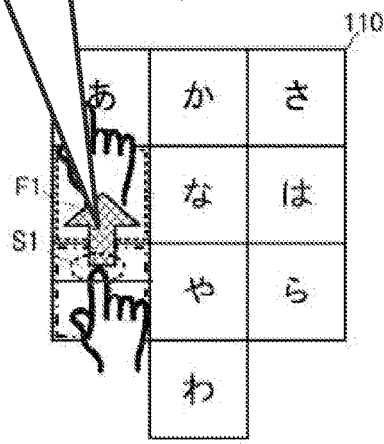
Figure 2C:
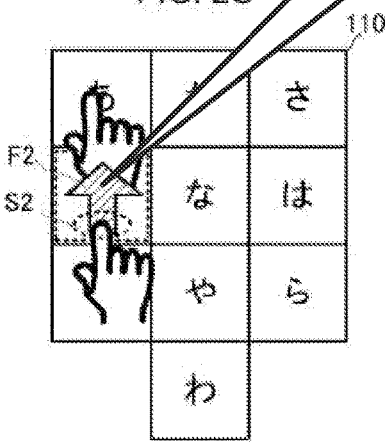
Figure 3:
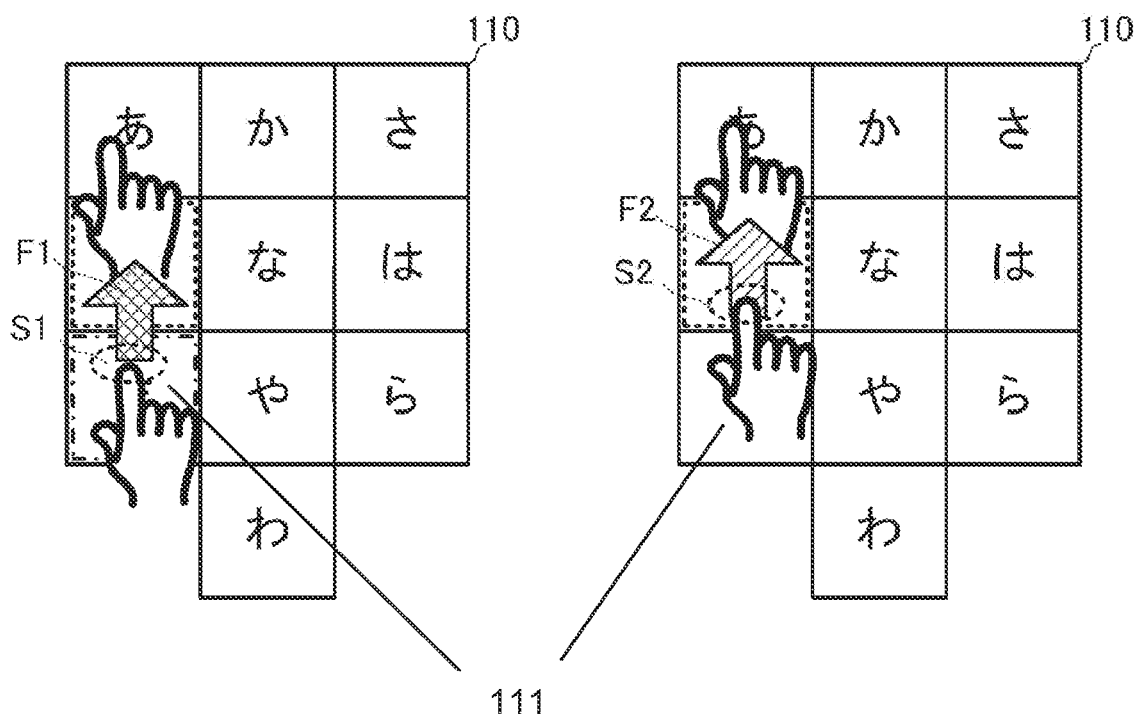
FIG. 3 is a schematic diagram illustrating an operation unit in a character input device according to a first embodiment.
Figure 4:
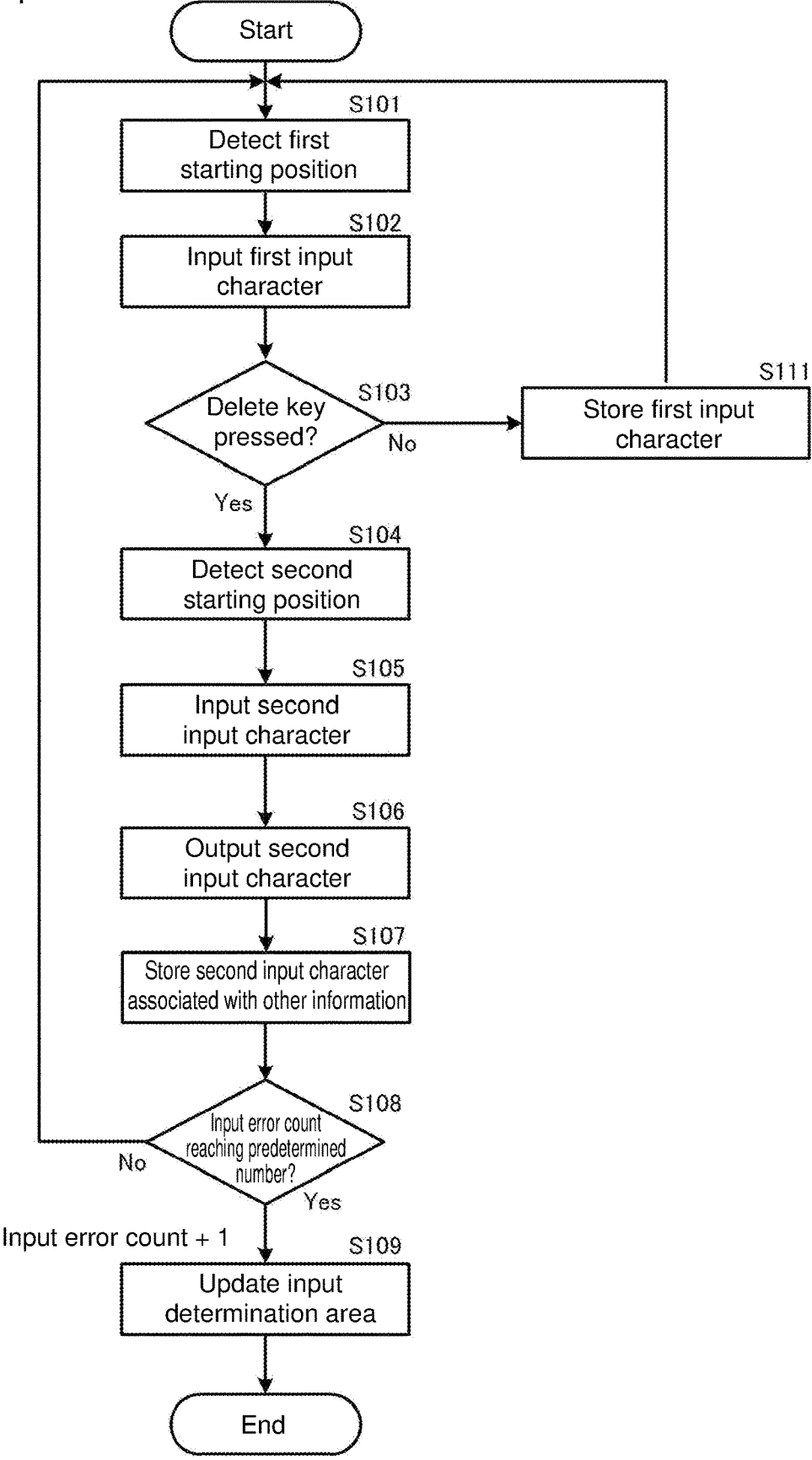
FIG. 4 is a flow diagram illustrating a process performed by a character input device according to a first embodiment.

FIG. 1 is a block diagram of a character input device 10 according to a first embodiment. FIGS. 2A to 2C are schematic diagrams of the character input device 10 according to a first embodiment. FIG. 3 is a schematic diagram of an operation unit in the character input device 10 according to a first embodiment. FIG. 4 is a flowchart showing a process performed by the character input device 10 according to a first embodiment.

An example structure involving an input error will now be described in more detail with reference to FIGS. 2A to 2C based on the structure of the character input device 10 shown in FIG. 1.

As shown in FIGS. 1 and 2A to 2C, the character input device 10 includes the operation unit 110 and the character output unit 160. FIGS. 2B and 2C are enlarged views of the operation unit 110 in FIG. 2A.

The character output unit 160 displays a field for character input. The field is, for example, a memo pad application or an email application.

In the example described below, the user intends to input "たいせつ" (Japanese hiragana character string Taisetsu) on the character output unit 160. The user first inputs "たいせ" (characters Taise) and then inputs "つ" (character Tsu).

In the example shown in FIG. 2B, a first starting position S1 corresponds to a position for inputting characters included in the hiragana "ま"-column (character M-column) of the Japanese syllabary table. The user then slides his or her digit in a first operation direction F1 (upward direction). According to conventional flick input conventions, as would be appreciated by one of ordinary skill in the art, a flick input with a starting position on "ま" and a flick in an upward operation direction corresponds to the character "む". Therefore, the character "む" is added to the character string to be displayed in the output unit 160. As a result, "たいせむ" (character string Taisemu) is output to the character output unit 160. Similar operation is relevant to the other flick inputs described throughout the specification and illustrated, for example, in FIG. 2C (e.g., where the starting character is "た" and the character resulting from an upward flick is "つ").

The user determines that the input is erroneous, and presses a delete button on the operation unit 110 to delete "む" (character Mu) in "たいせむ" (character string Taisemu) in the state shown in FIG. 2B.

The user then places his or her digit at a second starting position S2 corresponding to a position for inputting characters included in the hiragana "た"-column (character T-column) as shown in FIG. 2C. The user slides his or her digit in a second operation direction F2 (upward direction). As a result, "たいせつ" (character string Taisetsu) is output to the character output unit 160.

The operation detector 120 outputs information indicating the second input character "つ", the first starting position S1, and the first operation direction F1 to the controller 130. The controller 130 outputs information indicating the first operation direction F1, the second input character "つ", and the first starting position S1 to the determination unit 140.

The determination unit 140 determines that the user intends to input the character "つ" based on the first starting position S1 and the first operation direction F1.

The determination unit 140 outputs information indicating the first operation direction F1, the second input character "つ", and the first starting position S1 to the controller 130. The controller 130 stores information indicating the first operation direction F1, the second input character "つ", and the first starting position S1 in a manner associated with one another into the storage 150.

The user repeats the operation shown in FIGS. 2B and 2C to cause the determination unit 140 to learn the tendency in the input operation performed by the user. More specifically, the learning process is repeated until the input error count reaches a predetermined number (threshold). In other words, the input determination area is updated when the input error count reaches the predetermined number.

As a result, the input determination area for inputting the character "つ" in the hiragana "た"-column extends toward the hiragana "ま"-column as shown in FIG. 3.

In other words, the controller 130 extends the input determination area for inputting characters included in the hiragana "た"-column on the operation unit 110 to an area 111. As a result, the user can input the character "つ" as intended when the first starting position S1 is shifted toward the hiragana "ま"-column.

The input determination area alone is changed in the area 111. In other words, the area for the hiragana "た"-column visually remains the same. This allows the user to input a character as intended without visually noticing any change.

A process performed by the character input device 10 will now be described with reference to the flowchart in FIG. 4.

The operation unit 110 receives an input of the first input character from the user. The operation detector 120 detects the first starting position S1 for the first input character (S101).

The user inputs the first input character with a sliding operation from the first starting position S1 in the first operation direction F1. The operation detector 120 outputs information indicating the first operation direction F1, the first starting position S1, and the first input character to the controller 130. The controller 130 outputs information indicating the first input character to the character output unit 160 (S102).

The operation detector 120 determines whether the user has pressed the delete key (S103).

After the delete key is pressed (Yes in S103), the operation unit 110 receives an input of the second input character from the user. The operation detector 120 detects the second starting position S2 for the second input character (S104).

The user inputs the second input character with a sliding operation from the second starting position S2 in the second operation direction F2 (S105).

The operation detector 120 outputs information indicating the second starting position S2, the second operation direction F2, and the second input character to the controller 130. The controller 130 outputs information indicating the second starting position S2, the second operation direction F2, and the second input character to the determination unit 140 (S106).

The determination unit 140 outputs information indicating the first operation direction F1, the second input character, and the first starting position S1 to the controller 130. The controller 130 stores information indicating the first operation direction F1, the second input character, and the first starting position S1 in a manner associated with one another into the storage 150 (S107). As a result, the storage 150 can accumulate the history of input errors made by the user.

When the second input character differs from the first input character, the determination unit 140 determines that the user has made an input error, and then determines whether the input error count reaches the predetermined number (S108).

When the input error count reaches the predetermined number (Yes in S108), the controller 130 updates the input determination area based on the history of input errors stored in the storage 150 (S109).

When the input error count has yet to reach the predetermined number (No in S108), the process returns to step S101 to receive a character input.

When the delete key is not pressed (No in S103), the first input character is stored into the storage 150 (S111).

The structure described above can update the input determination area in accordance with the input error count for the user, thus allowing the user to easily input characters as intended and improving the usability for character input.

Example Structure 2

Figure 5A:
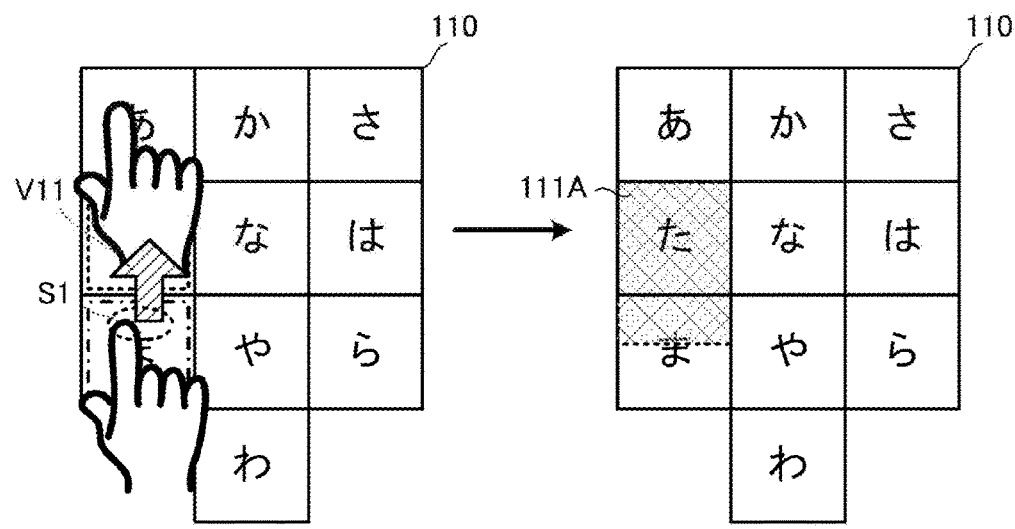
FIGS. 5A and 5B are schematic diagrams each illustrating adjustment of an input determination area for a character input device according to a second embodiment.
Figure 5B:
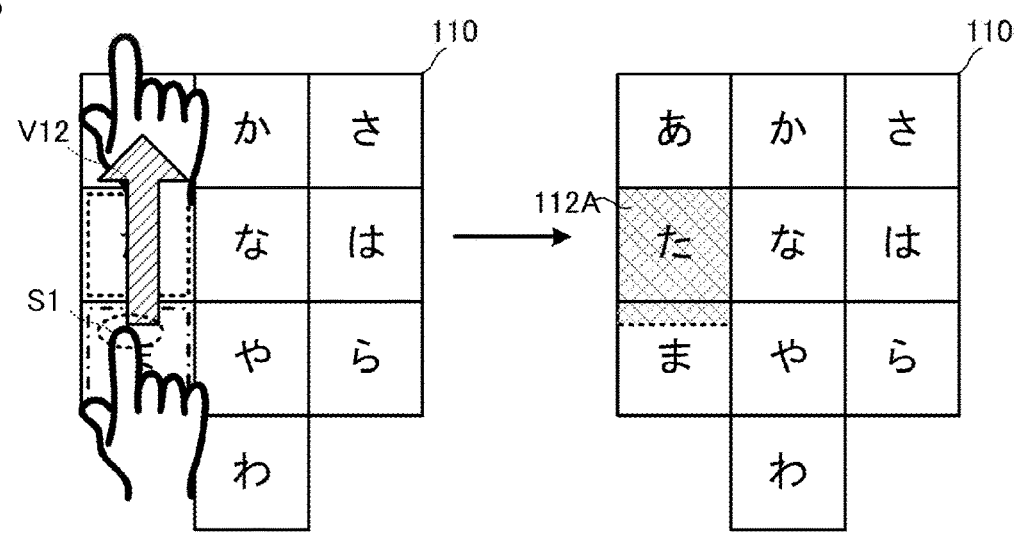

A specific structure of a character input device 10 according to another embodiment will now be described with reference to FIGS. 5A and 5B. FIGS. 5A and 5B are schematic diagrams each describing adjustment of an input determination area for a character input device 10 according to a second embodiment.

A second embodiment differs from a first embodiment in detecting the acceleration in a sliding operation for an input character. The other components and processes are the same as those in a first embodiment, and will not be described.

In the example operation described below, a user intends to input "つ" (Japanese hiragana character Tsu). The user performs a sliding operation from the first starting position S1 with a first operation vector V11 in FIG. 5A. The user performs a sliding operation from the first starting position S1 with a second operation vector V12 in FIG. 5B.

The first starting position S1 corresponds to a position for inputting characters included in the hiragana "ま"-column as shown in FIG. 5A. A user operation intended to input "つ" causes an output of "む". In the same manner, the first starting position S1 corresponds to the hiragana "ま"-column as shown in FIG. 5B. A user operation intended to input "つ" causes an output of "む".

An example operation will be described first with reference to FIG. 5A. The user determines that "む" is input erroneously, and deletes "む" by pressing the delete button.

The user then correctly inputs "つ" by placing his or her digit on a position corresponding to the second starting position S2 for inputting characters included in the hiragana "た"-column.

The operation detector 120 outputs information indicating the second input character "つ", the first starting position S1, and the first operation vector V11 to the controller 130. The controller 130 outputs information indicating the second input character "つ", the first starting position S1, and the first operation direction F1 to the determination unit 140.

The determination unit 140 outputs information indicating the second input character "つ", the first starting position S1, and the first operation vector V11 to the controller 130. The controller 130 stores information indicating the second input character "つ", the first starting position S1, and the first operation vector V11 in a manner associated with one another into the storage 150.

In the same manner as in FIG. 5B, the user determines that "む" is input erroneously, and deletes "む" by pressing the delete button.

The user then correctly inputs the character "つ" by placing his or her digit on a position corresponding to the second starting position S2 for inputting characters included in the hiragana "た"-column.

The operation detector 120 outputs information indicating the second input character "つ", the first starting position S1, and the second operation vector V12 to the controller 130. The controller 130 outputs information indicating the second input character "つ", the first starting position S1, and the second operation vector V12 to the determination unit 140.

The structure described above causes the determination unit 140 to update the input determination area in the operation unit 110 in each of FIGS. 5A and 5B.

The first operation vector V11 and the second operation vector V12 are compared with each other. The first operation vector V11 is smaller than the second operation vector V12. More specifically, the velocity of the second operation vector V12 is larger than that of the first operation vector V11.

When the sliding operation performed by the user is not quick, the determination unit 140 determines that the user has input a character with no hurry. In contrast, when the sliding operation performed by the user is quick, the determination unit 140 determines that the user has input a character in a hurry.

Thus, the determination unit 140 determines that the user even in no hurry may make an input error in the state shown in FIG. 5A, or more specifically, that the user is likely to make an input error in the state shown in FIG. 5A. As a result, the determination unit 140 defines an area 111A for an operation with the first operation vector V11 to be larger than an area 112A for an operation with the second operation vector V12 shown in FIG. 5B.

The structure described above can update the input determination area in accordance with the vector of a sliding operation performed by the user, thus allowing the user to easily input characters as intended and improving the usability for character input.

Example Structure 3

A specific structure of a character input device 10 according to another embodiment will now be described with reference to FIGS. 6A to 6D. FIGS. 6A to 6D are schematic diagrams each describing adjustment of an input determination area for a character input device 10 according to a third embodiment.

A third embodiment differs from a first embodiment in using the context in a character input. The other components and processes are the same as those in a first embodiment, and will not be described.

Figure 6A:
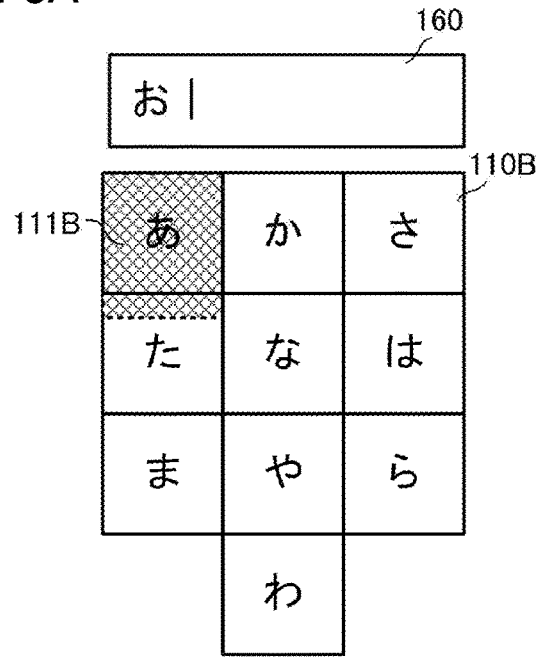
FIGS. 6A to 6D are schematic diagrams each illustrating adjustment of an input determination area for a character input device according to a third embodiment.

FIG. 6A shows an example in which "お"(Japanese hiragana character O) is input at the beginning of a sentence. When the determination unit 140 determines that the user is likely to erroneously input "と" (character To) in an operation intended to input "お" at the beginning of a sentence, the input determination area is updated to an area 111B.

Figure 6B:
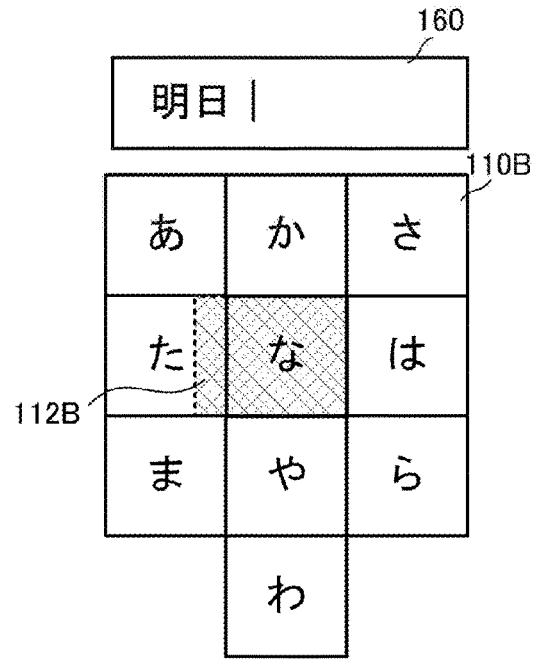

FIG. 6B shows an example in which "明日に" (kanji or Chinese characters Ashita followed by the hiragana character Ni) are input. When the determination unit 140 determines that the user is likely to erroneously input "ち" (character Chi) after converting characters, or specifically converting "あした" (Japanese hiragana characters Ashita) into "明日", the input determination area is updated to an area 112B.

Figure 6C:
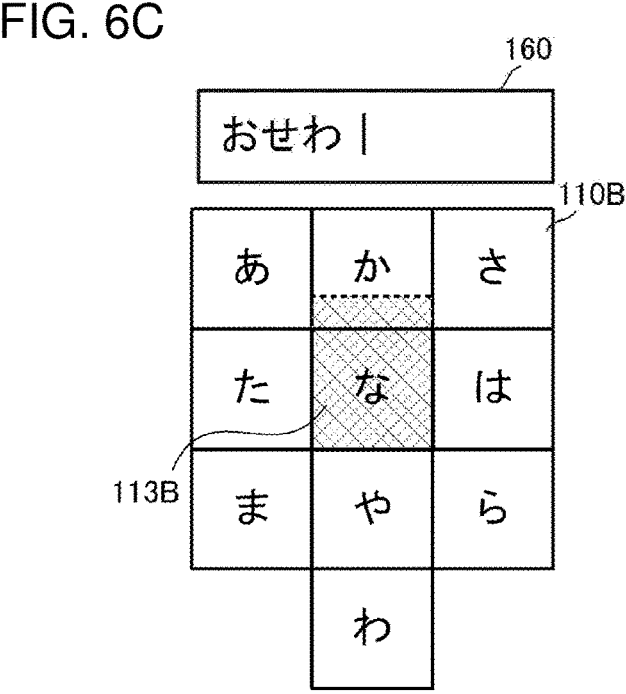

FIG. 6C shows an example in which "おせわに" (characters Osewani) are input. When the determination unit 140 determines that the user is likely to erroneously input "き" (character Ki) in an operation intended to input "に", the input determination area is updated to an area 113B.

Figure 6D:
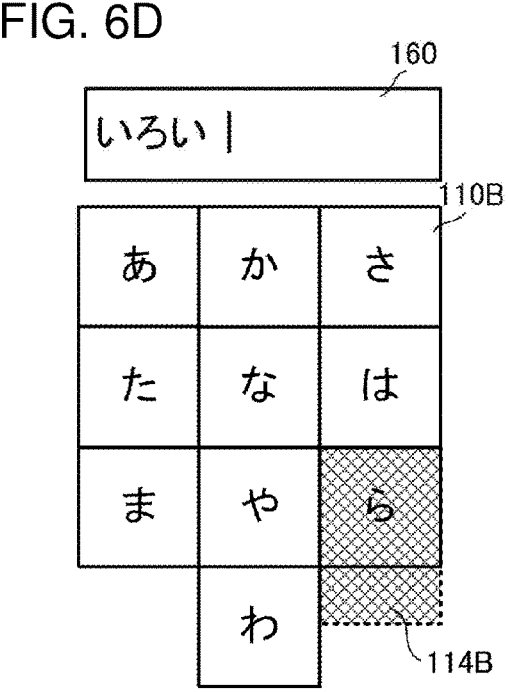

FIG. 6D shows an example in which "いろいろ" (characters Iroiro) are input. When the determination unit 140 determines that the user is likely to make an input error, or for example input a symbol instead of an intended character in an operation intended to input characters in a repeated manner, or specifically "ろ" (character Ro) after "いろい" (characters Iroi), the input determination area is updated to an area 114B.

The structure described above allows the determination unit 140 to determine whether to update the input determination area when the count of input errors made by the user reaches a predetermined number.

The structure described above can update the input determination area in accordance with a sentence input by the user or its context, thus allowing the user to easily input characters as intended and improving the usability for character input.

Example Structure 4

Figure 7A:
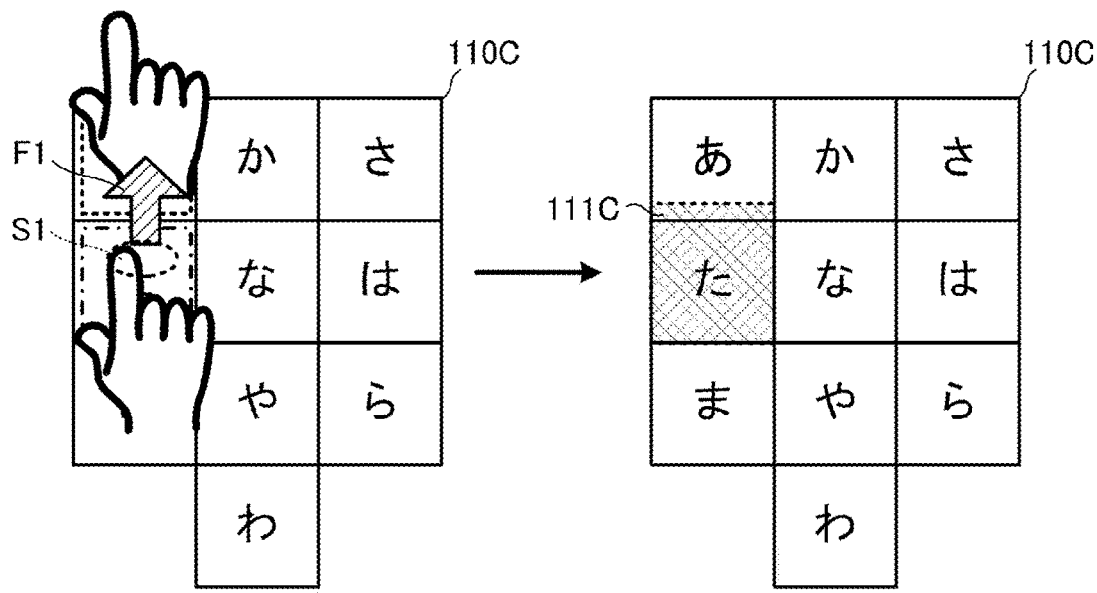
FIGS. 7A and 7B are schematic diagrams each illustrating adjustment of an input determination area for a character input device according to a fourth embodiment.
Figure 7B:
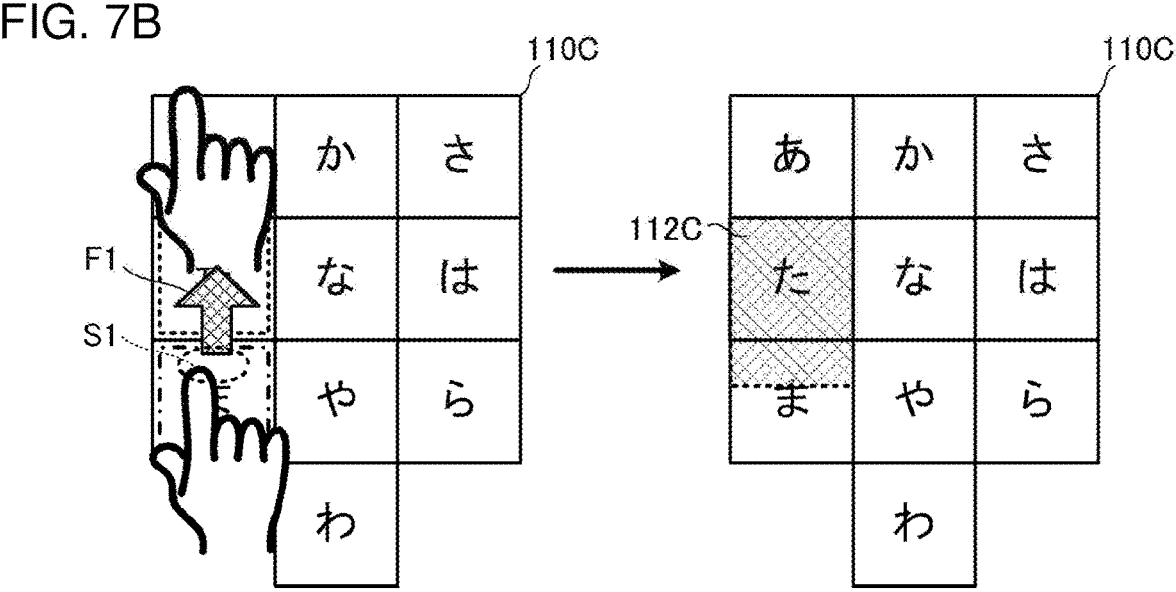

A specific structure of a character input device 10 according to another embodiment will now be described with reference to FIGS. 7A and 7B. FIGS. 7A and 7B are schematic diagrams each describing adjustment of an input determination area for a character input device 10 according to a fourth embodiment.

A fourth embodiment differs from a first embodiment in using the flick direction in determining an input error. The other components and processes are the same as those in a first embodiment, and will not be described.

FIG. 7A shows an example in which "つ" (Japanese hiragana character Tsu) is input. When determining that the user is likely to erroneously input "う" (character U) in an operation intended to input "つ", the determination unit 140 determines that the user is likely to erroneously input a character located in the same direction as the first operation direction F1. In other words, the user erroneously inputs "う" included in the hiragana "あ"-column (character A-column) located in the same direction as the first operation direction F1, and the determination unit 140 determines that the user is likely to make an input error. As a result, the input determination area is updated to an area 111C.

FIG. 7B shows an example in which "つ" is input. When determining that the user is likely to erroneously input "む" in an operation intended to input "つ", the determination unit 140 determines that the user is likely to erroneously input a character located in a direction opposite to the first operation direction F1. In other words, the user erroneously inputs the character "む" included in the hiragana "ま"-column located in the direction opposite to the first operation direction F1. The determination unit 140 thus determines that the user is likely to make an input error in the state shown in FIG. 7B, although the user is inputting a character for which an input error is usually unlikely to occur. As a result, the determination unit 140 updates the input determination area to an area 112C.

The examples shown in FIGS. 7A and 7B will now be compared. When many input errors occur at a position where an input error is less likely to occur based on the flick direction, the determination unit 140 determines that the input determination area is to be extended greatly. The determination unit 140 then extends the area 112C by a degree greater than the area 111C.

The structure described above can update the input determination area in accordance with a sentence input by the user or its context, thus allowing the user to easily input characters as intended and improving the usability for character input.

The above structure uses a flick input as an example and may also use glide typing.

Structures may be expressed as specified in the appendix below.

Appendix

A character input device (10), including:

an operation unit (110) configured to receive a character input performed with a flick input;

an operation detector (120) configured to detect a starting position of the flick input; and a determination unit (140) configured to adjust an input determination area for the character input in response to the starting position in accordance with an input error count for the flick input.

REFERENCE SIGNS LIST

F1 first operation direction
F2 second operation direction
S1 first starting position
S2 second starting position
V11 first operation vector
V12 second operation vector
10 character input device
110 operation unit
111, 111B, 111C, 112A, 112B, 112C, 113B, 114B area
120 operation detector
130 controller
140 determination unit
150 storage
160 character output unit

The invention claimed is:

1. A character input device, comprising: an operation unit comprising a touchscreen having input determination areas that correspond to input characters displayed on the touchscreen, the touchscreen configured to receive from a user, a flick input corresponding to a first input character; and the character input device is configured to perform operations comprising: detecting a first starting position in a first input determination area and an operation direction of the flick input corresponding to the first input character; detecting a pressing of a delete key on the touchscreen indicating an input error associated with the first input character; and in response to detecting the pressing of the delete key on the touchscreen, and detecting a second starting position in a second input determination area and an operation direction of a flick input corresponding to a second input character, wherein the second input determination area is different from the first input determination area and corresponds to different input characters, incrementing an input error count; storing, a history of input errors comprising: the second input character in association with the first starting position and the first operation direction; the user repeats the operations until the input error count reaches a threshold; and adjusting the second input determination area in response to the input error count exceeding the threshold, based on the stored history of input errors, while maintaining a visual appearance of the input characters displayed on the touchscreen in an unchanged state, by extending the second input determination area in a direction toward the first starting position in the first input determination area, such that the extended second input determination area comprises the first starting position.

2. A character input method implementable by a character input device included in a mobile device, the method comprising operations including: receiving from a user, on a touchscreen of the character input device having input determination areas that correspond to displayed input characters, a flick input corresponding to a first input character;
  detecting, a first starting position in a first input determination area and an operation direction of the flick input corresponding to the first input character;
  detecting, a pressing of a delete key on the touchscreen indicating an input error associated with the first input character; and
  in response to detecting the pressing of the delete key on the touchscreen, and detecting a second starting position in a second input determination area and an operation direction of a flick input corresponding to a second input character, wherein the second input determination area is different from the first input determination area and corresponds to different input characters, incrementing an input error count; storing, a history of input errors comprising: the second input character in association with the first starting position and the first operation direction; the user repeats the operations until the input error count reaches a threshold; and adjusting the second input determination area in response to the input error count exceeding the threshold, based on the stored history of input errors, while maintaining a visual appearance of the input characters displayed on the touchscreen in an unchanged state, by extending the second input determination area in a direction toward the first starting position in the first input determination area, such that the extended second input determination area comprises the first starting position.

3. A non-transitory computer-readable storage medium storing a character input program, which when read and executed, causes a character input device of a mobile device, to perform operations comprising: receiving a user, on a touchscreen of the character input device having input determination areas that correspond to displayed input characters, a flick input corresponding to a first input character;
  detecting, by the character input device, a first starting position in a first input determination area and an operation direction of the flick input corresponding to the first input character;
  detecting, by the character input device, a pressing of a delete key on the touchscreen indicating an input error associated with the first input character;
  in response to detecting the pressing of the delete key on the touchscreen, and detecting a second starting position in a second input determination area and an operation direction of a flick input corresponding to a second input character, wherein the second input determination area is different from the first input determination area and corresponds to different input characters, incrementing an input error count; storing, a history of input errors comprising: the second input character in association with the first starting position and the first operation direction; the user repeats the operations until the input error count reaches a threshold; and adjusting the second input determination area in response to the input error count exceeding the threshold, based on the stored history of input errors, while maintaining a visual appearance of the input characters displayed on the touchscreen in an unchanged state, by extending the second input determination area in a direction toward the first starting position in the first input determination area, such that the extended second input determination area comprises the first starting position.

* * * * *